J. R. WRIGHT.
RIM BREAKER.
APPLICATION FILED FEB. 15, 1917.
1,242,409.
Patented Oct. 9, 1917.
2 SHEETS—SHEET 1.
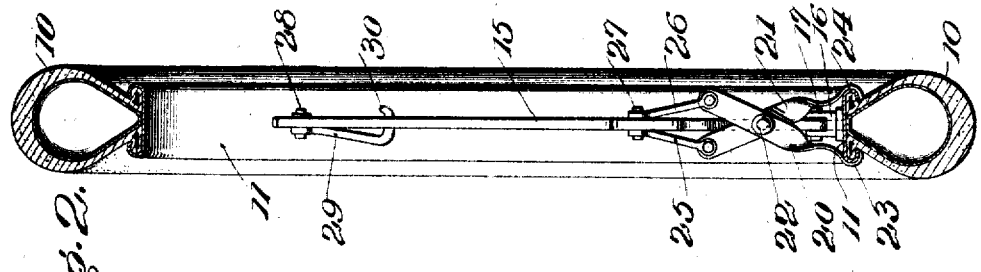
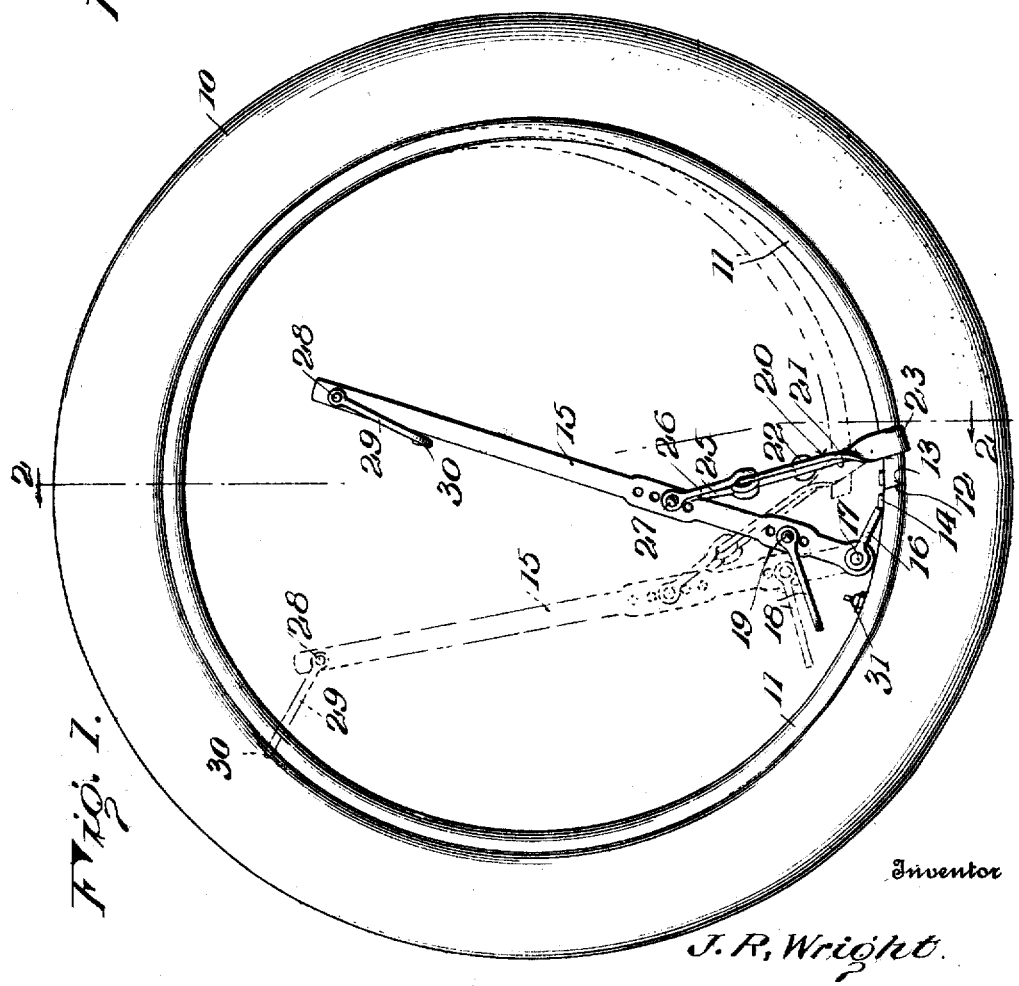
Inventor
J. R. Wright.
By
Attorneys.

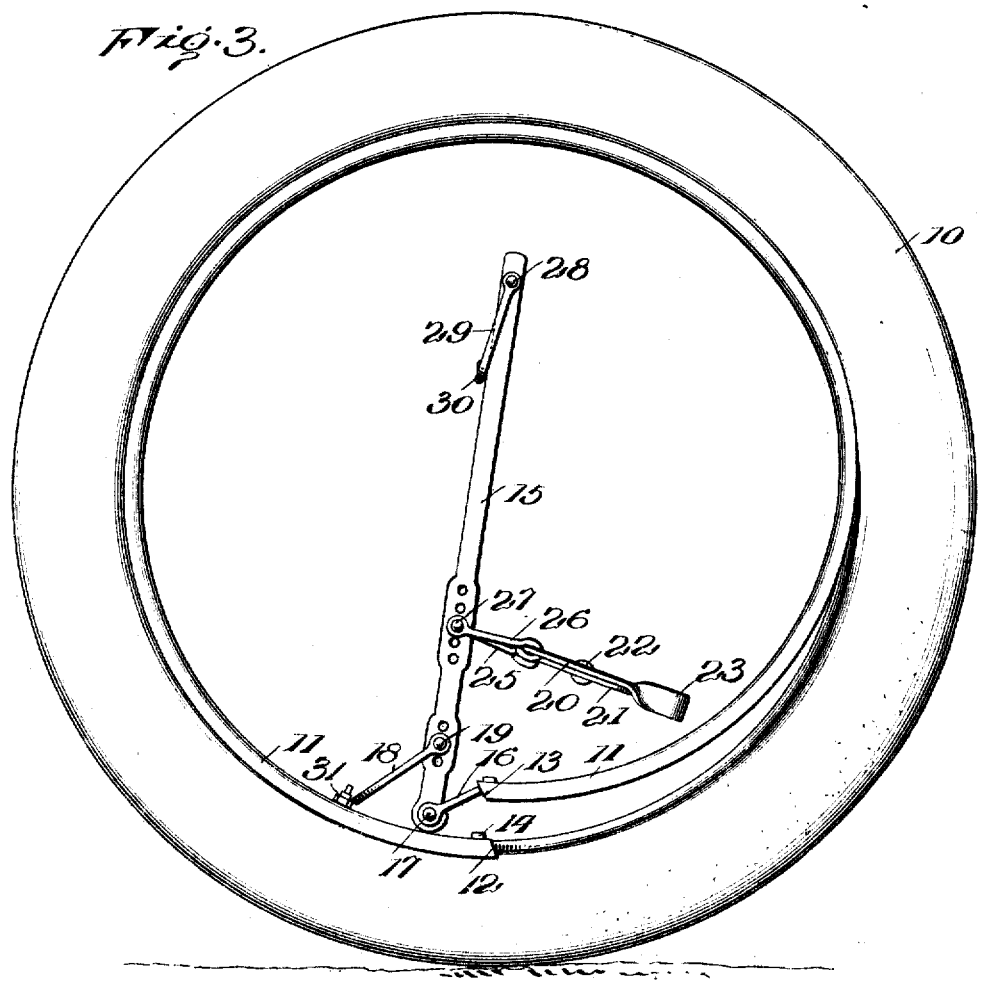

UNITED STATES PATENT OFFICE.

JOHN R. WRIGHT, OF LEGRAND, IOWA.

RIM-BREAKER.

1,242,409.  Specification of Letters Patent.  Patented Oct. 9, 1917.

Application filed February 15, 1917. Serial No. 148,824.

*To all whom it may concern:*

Be it known that I, JOHN R. WRIGHT, a citizen of the United States, residing at Legrand, in the county of Marshall, and State of Iowa, have invented certain new and useful Improvements in Rim-Breakers, of which the following is a specification.

This invention relates to improvements in rim breakers, and has for one of its objects to improve the construction and increase the efficiency and utility of devices of this character.

Another object of the invention is to provide an implement which may be employed for detaching the rim from the tire, or attaching the rim to the tire without structural change in the implement or detaching any of the parts.

With these and other objects in view, the invention consists in certain novel features of construction, as hereinafter shown and described and then specifically pointed out in the claim; and in the drawings illustrative of the preferred embodiment of the invention—

Figure 1 is a side elevation of an automobile tire and the wheel rim demounted from the body of the wheel, with the implement applied in position for detaching the rim from the tire.

Fig. 2 is an edge view of the improved implement applied as shown in Fig. 1, with the tire and rim in section on the line 2—2 of Fig. 1.

Fig. 3 is a view similar to Fig. 1, illustrating the manner of employing the implement for attaching the rim to the tire.

Corresponding and like parts are referred to in the following description and indicated in all the views of the drawings by the same reference characters.

The rims of demountable pneumatic-tires are generally divided at one point and provided with suitable coupling devices to hold the ends of the rim in position, and the object of the present invention is to contract the rim at one side of the joint, or move it toward the center of the rim, to reduce its diameter to enable it to be detached from the tire, and the same implement is arranged to expand the rim and forcibly return it to position in engagement with the tire.

In the drawings the tire portion is represented as a whole at 10 and the divided rim at 11, the terminals being usually "scarfed" as shown at 12—13. The coupling device whereby the scarfed ends 12—13 are united is indicated at 14.

The improved implement comprises a lever 15 which constitutes the stock or body portion of the implement, and is extended into a hand grip portion at one end and with a relatively small foot piece or engaging toe 16 pivoted at 17 to the lever 15 at one end, and a fulcrum bar 18 pivoted to the lever 15 at 19, the pivots 17—19 being disposed in spaced relation, as shown. A gripping device forms a part of the implement and comprises arms 20—21 pivotally united at 22, the arm 20 terminating in a hook 23 at one end, while the arm 21 terminates in a hook 24 in one end, the hook portions designed to grasp the turned-over edges of the rim, as illustrated in Fig. 2. At their opposite ends the members 20—21 are coupled by links 25—26 to the lever 15 by a transverse pin or bolt 27. By this means it will be obvious that when longitudinal strain is applied to the links 25—26 the hook portions 23—24 will be caused to firmly grip the rim 11. In using the improved implement to disconnect the rim from the tire, the lower end of the lever 15 is disposed upon the rim at one side of the joint 12—13, and the foot piece 16 engaged with the projecting portion of the coupling member 14, as shown in Fig. 1. The hook portions 23—24 are then engaged with the rim at the opposite side of the joint 12—13 from the lever 15 and its foot piece 16, and the lever 15 utilized to apply a pulling strain upon the gripping implement, thereby "breaking" the rim, or disposing it in the position shown by dotted lines in Fig. 1. This movement will reduce the diameter of the rim to a sufficient extent to enable it to be readily removed from the tire. Mounted to swing at 28 is a bar or link 29 having a lateral hook 30 at its free end to engage the rim 11 when the lever 15 is disposed in the position shown by dotted lines in Fig. 1, or when the foot piece 16 has reached the limit of its stroke in contracting the rim and reducing its diameter. By this means the rim may be retained in its contracted position as long as required. In inserting the rim into the tire the portion through which the air valve, indicated at 31, extends, is inserted in position within the tire and the implement arranged as shown in Fig. 3, with the fulcrum member 18 engaged with the projecting portion of the air valve and the foot piece 16 engaged against the contracted terminal 13 of the rim. The lever 15 is then actuated in the same manner as when demounting the rim, with the result of expanding the contracted portion of the rim and restoring it to position with the scarfed terminal 13 in engagement with the terminal 12. When the implement is employed for contracting the rim the fulcrum member 18 is inoperative, as shown in Fig. 1, and when the implement is employed for restoring the rim to its position within the tire the gripping device remains inoperative as shown in Fig. 3.

By this means a simply constructed and effective implement is produced whereby the rim may be detached from the tire or inserted within the tire without detaching any of the parts.

The improved implement is constructed wholly of metal as light as possible consistent with the strains to which it will be subjected, and operates effectually for the purposes described.

The lever member 15 will preferably be provided with a plurality of apertures in spaced relation, to receive the pivot members 19—27, to enable the gripping device and the fulcrum member 18 to be adjusted longitudinally of the lever, to increase or decrease the leverage, if required, or to adapt the device to rims of various sizes or diameters.

Having thus described the invention, what is claimed as new is—

A rim breaker comprising a lever having a hand grip at one end and foot piece pivoted to the other end, a rim gripping device pivoted intermediate the ends, a fulcrum device pivoted between the gripping device and the foot piece, and means adapted to couple the hand grip end of the lever to the rim.

In testimony whereof I affix my signature.

JOHN R. WRIGHT. [L. S.]